US010511816B2

(12) United States Patent
Kiamilev et al.

(10) Patent No.: US 10,511,816 B2
(45) Date of Patent: Dec. 17, 2019

(54) NON-UNIFORMITY OUTPUT DETERMINATION FOR LIGHT PROJECTORS

(71) Applicants: Fouad Kiamilev, Hockessin, DE (US); Andrea Waite, Newark, DE (US)

(72) Inventors: Fouad Kiamilev, Hockessin, DE (US); Andrea Waite, Newark, DE (US)

(73) Assignee: UNIVERSITY OF DELAWARE, Newark, DE (US)

( * ) Notice: Subject to any disclaimer, the term of this patent is extended or adjusted under 35 U.S.C. 154(b) by 101 days.

(21) Appl. No.: 15/446,250

(22) Filed: Mar. 1, 2017

(65) Prior Publication Data
US 2017/0257607 A1 Sep. 7, 2017

Related U.S. Application Data

(60) Provisional application No. 62/301,843, filed on Mar. 1, 2016.

(51) Int. Cl.
*H04N 9/31* (2006.01)
*H04N 9/12* (2006.01)

(52) U.S. Cl.
CPC ......... *H04N 9/3155* (2013.01); *H04N 9/3138* (2013.01); *H04N 9/3164* (2013.01); *H04N 9/3182* (2013.01); *H04N 9/3191* (2013.01); *H04N 9/3194* (2013.01)

(58) Field of Classification Search
CPC .................................... H04N 9/3155
USPC .......................................... 348/687
See application file for complete search history.

(56) References Cited

U.S. PATENT DOCUMENTS

| 2005/0057670 | A1* | 3/2005 | Tull | H04N 5/217 348/241 |
| 2010/0033683 | A1* | 2/2010 | Reichow | G03B 21/26 353/30 |
| 2015/0301687 | A1* | 10/2015 | Booth | G09G 3/3208 345/175 |

* cited by examiner

*Primary Examiner* — Jefferey F Harold
*Assistant Examiner* — Justin B Sanders
(74) *Attorney, Agent, or Firm* — RatnerPrestia

(57) ABSTRACT

The present invention relates to a calibration system and method including a pixelated display including pixels for projecting an image, an imager positioned to capture the image produced by the pixelated display, and a processor. The processor is configured to determine and measure non-uniformity in the image produced by the pixelated display by repeatedly selecting and illuminating a subset of the pixels in the pixelated display with respective driving currents, controlling the imager to capture the image projected by the subset pixels, determining and storing, for each pixel in the subset, an intensity value produced in response to the respective driving current, and updating, for each pixel in the subset, the respective driving currents based on the determined intensity value and previously stored intensity values corresponding with previously stored driving currents.

20 Claims, 8 Drawing Sheets

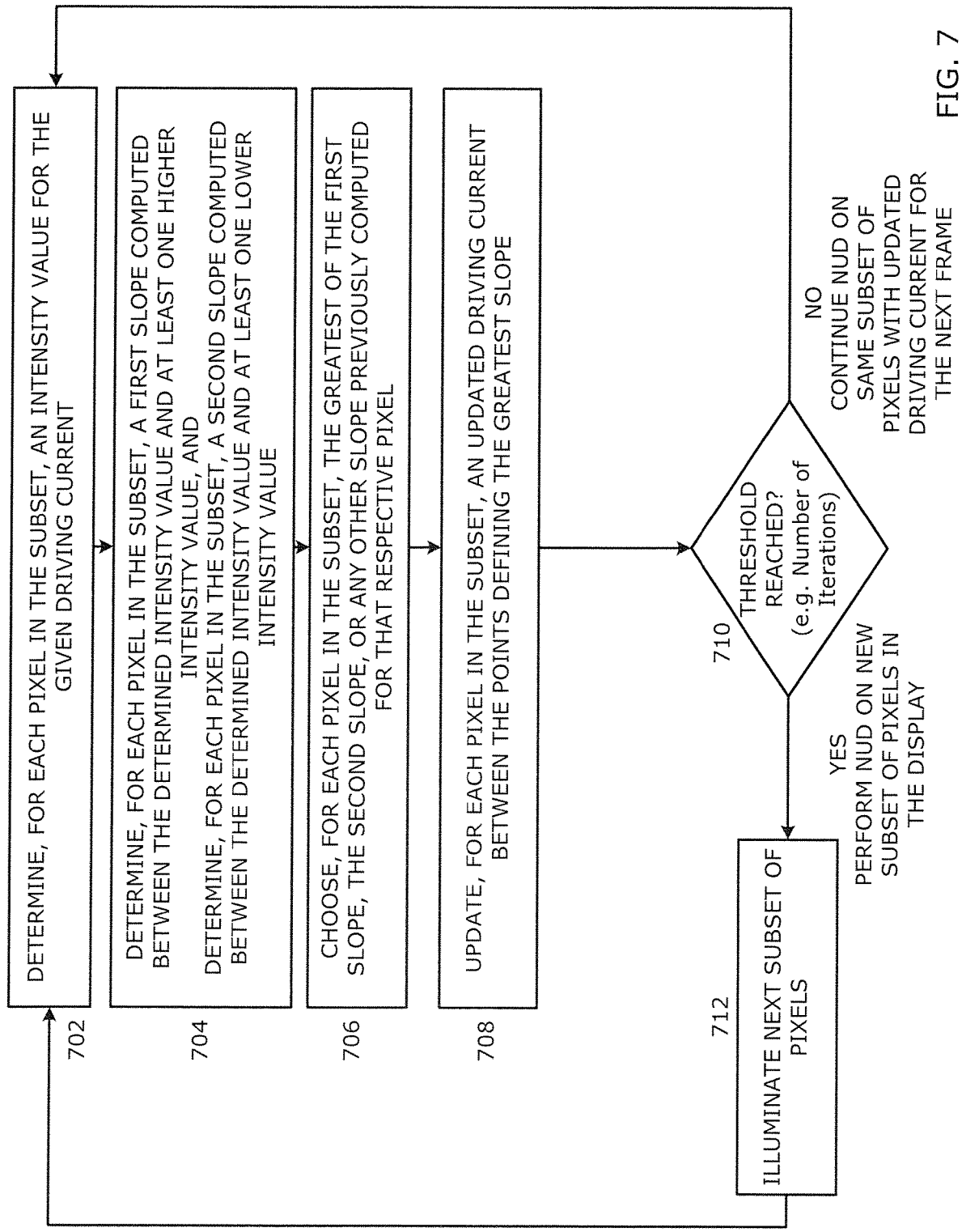

NON-UNIFORMITY OUTPUT DETERMINATION FOR LIGHT PROJECTORS

CROSS REFERENCE TO RELATED APPLICATIONS

This application claims priority to U.S. Provisional Application No. 62/301,843, filed Mar. 1, 2016. The contents of U.S. Provisional Application No. 62/301,843 are incorporated by reference herein.

FIELD

The present invention relates to non-uniformity output determination for light projectors.

BACKGROUND

Pixelated displays (e.g. light projectors) drive light emitting elements such as infrared light emitting diodes (IRLEDs) to project an IR image. These IRLEDs, however, are non-linear and non-uniform in their intensity output relationship with respect to the driving current. Their characteristics are also sensitive to heat during operation. Therefore, the same driving current produces different output light intensities in different pixels and depending on the operating temperature of the IRLED. Other factors also contribute to this non-linear behavior. This is problematic in applications that require highly accurate projected images.

SUMMARY

An embodiment includes a calibration system comprising a pixelated display including pixels for projecting an image, an imager positioned to capture the image produced by the pixelated display, and a non-uniformity determination processor configured to perform determination of non-uniformity in the image produced by the pixelated display by repeatedly: selecting and illuminating a subset of the pixels in the pixelated display with respective driving currents, controlling the imager to capture the image projected by the subset pixels, determining and storing, for each pixel in the subset, an intensity value produced in response to the respective driving current, and updating, for each pixel in the subset, the respective driving currents based on the determined intensity value and previously stored intensity values corresponding with previously stored driving currents.

Another embodiment includes a non-uniformity determination method for a pixelated display including pixels for projecting an image, the method comprising capturing, by an imager, the image produced by the pixelated display, and performing, by a non-uniformity determination processor, determination of non-uniformity in the image produced by the pixelated display by repeatedly selecting and illuminating a subset of the pixels in the pixelated display with respective driving currents, controlling the imager to capture the image projected by the subset pixels, determining and storing, for each pixel in the subset, an intensity value produced in response to the respective driving current, and updating, for each pixel in the subset, the respective driving currents based on the determined intensity value and previously stored intensity values corresponding with previously stored driving currents.

BRIEF DESCRIPTION OF THE FIGURES

FIG. 7 is another flowchart showing further details of the non-uniformity output determination (NUD) algorithm, according to an embodiment of the present invention.

DETAILED DESCRIPTION

Figure 1:
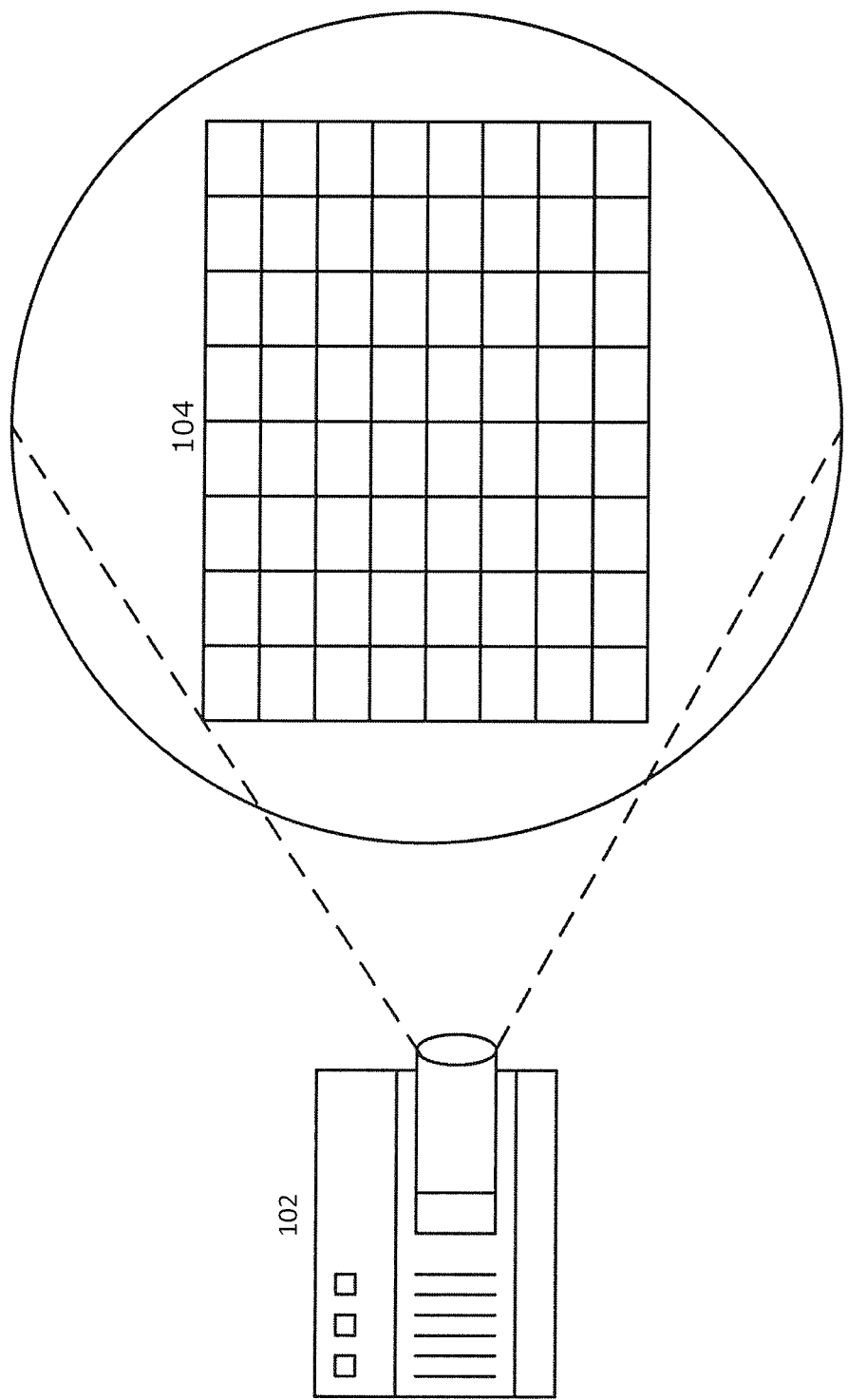
FIG. 1 is a view of a projector having pixelated display of IRLEDs, according to an embodiment of the present invention.

The present invention provides a method and system for non-uniformity output determination (NUD) for pixelated displays which may be used in projectors. For example, FIG. 1 shows a light projector 102 for projecting a scene image (e.g. static image, frames of a video sequence, etc.). The aperture of light projector 102 is shown close-up as including a pixelated display 104. For illustration/explanation purposes, pixelated display 104 is shown in FIG. 1 as having dimensions 8×8 (e.g. 64 total pixels). It is noted, however, that pixelated displays typically have greater dimensions such as 1024×1024 (e.g. 1,048,576 total pixels).

The examples described throughout this application are directed to projectors that have pixelated displays implementing as an N (e.g. 1024) column by M (e.g. 1024) row grid of pixels (e.g. a grid of infrared light emitting diodes (IRLEDs) that project IR images or video frames). It should be pointed out, however, the pixelated display may be implemented using visible light pixels such as visible light LEDs or other pixelated light sources operating at various bands (e.g. visible or non-visible bands) in the light spectrum.

In one example, the pixelated display of the projector may be implemented as a medium wavelength infrared (MWIR) 512×512 single color or multi-color, pitch superlattice light emitting diode (SLED) array driven from a digital visual interface (DVI) computer at a frame rate of 100 Hz. The projector may be configured with single or multiple DVI channels which feed the image to the projector.

During operation, a processor (not shown) in light projector 102 receives video frames from an input video source (not shown) such as a personal computer (PC), external memory device, etc. These video frames are then processed by the projector processor and projected into the field of view of a camera (not shown). The input video source PC uses video frame data to determine light intensities required for each pixel in the display to accurately project the video frame into the field of view of a camera.

Once the light intensities of the pixels are determined, this data is sent to the projector where the pixels are then driven by corresponding driving currents known by the projector processor. For example, the projector may receive a table from the PC and store this table in memory. This table indicates the necessary driving current to produce a desired intensity in each pixel for a given data frame. In another example, the table may be stored on the PC, and the PC will generate frames for illuminating the pixels based on the table, and send the frames to the projector.

Figure 2:
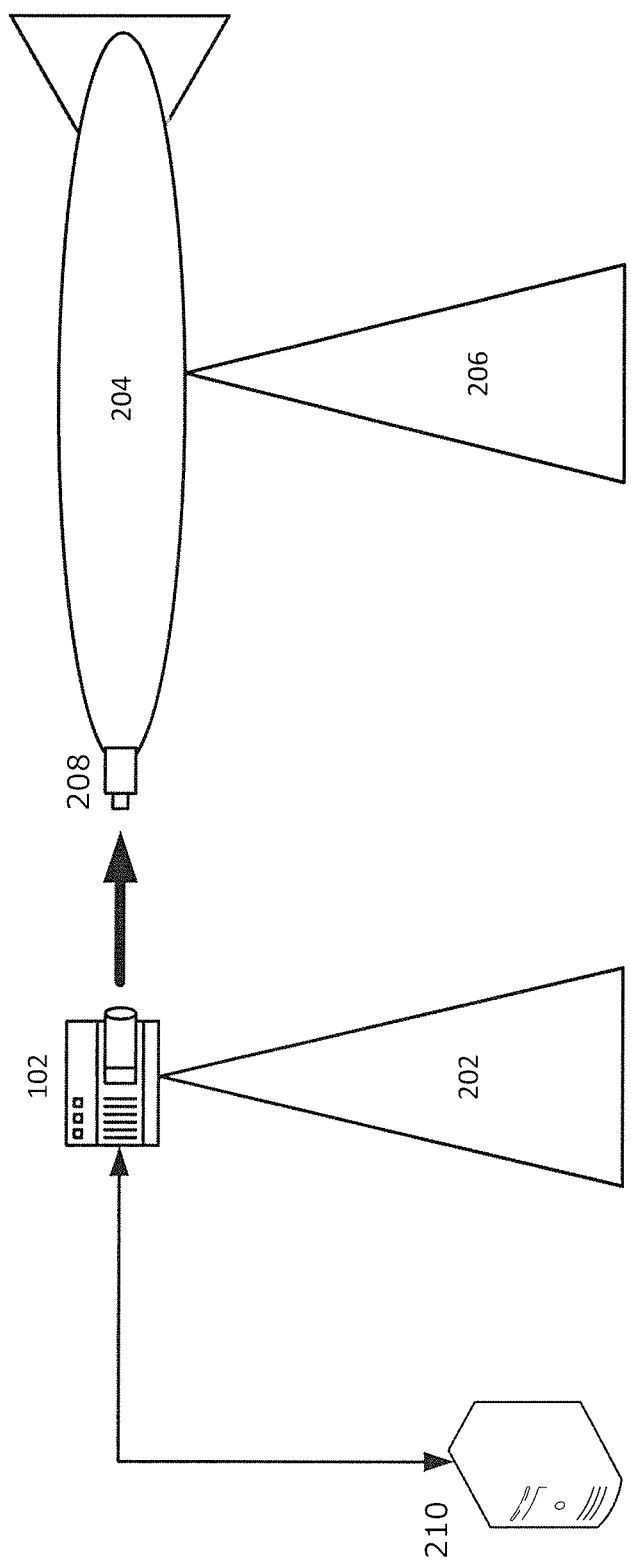
FIG. 2 is a view of the projector of FIG. 1 used in a military application for training a missile guidance system, according to an embodiment of the present invention.

In any event, errors in projected video frames may be unacceptable in certain applications. For example, FIG. 2 shows an application where the projector 102 mounted on stand 202 is used to project a video, provided by computer 210, to simulate an IR scene to train the guidance system of a missile 204 mounted on stand 206. During simulation, projector 102 projects the IR scene (including a simulated missile target) directly into the field of view of an imager (e.g. IR camera 208), which captures the IR image. A processor (not shown) of the missile guidance system processes the captured IR image to track the target, and controls the guidance system to adjust the attitude and speed of the missile to navigate towards the target. In one example, points in the IR image may be measured by apparent heat in the range from ambient room temperature (e.g. 60° F.) simulating the apparent heat of a night sky, and (e.g. 2500° F.) simulating the apparent heat of the exhaust of a fighter jet targeted by the missile.

In such an important simulation, errors in the projected video frames are unacceptable. For example, if the missile is tested based on a simulation that includes errors in light intensity of the scene, the missile guidance system may not be properly trained.

Error, as described above, may come about due to the complex behavior of the pixels in the array. For example, the relationship between the driving current and output light (e.g. apparent heat) intensity for each pixel may be non-linear due to various reasons (e.g. temperature of the pixel, manufacturing anomalies of the pixel, etc.). Thus, a single static table showing the relationship between driving current versus output light intensity may be insufficient to project accurate video frames. For example, a projector may drive the pixel with a driving current anticipating a certain light intensity output. The actual light intensity output, however, may not be as anticipated (e.g. it may be lower or higher than anticipated). This leads to error in the projected video frames.

Figure 3:
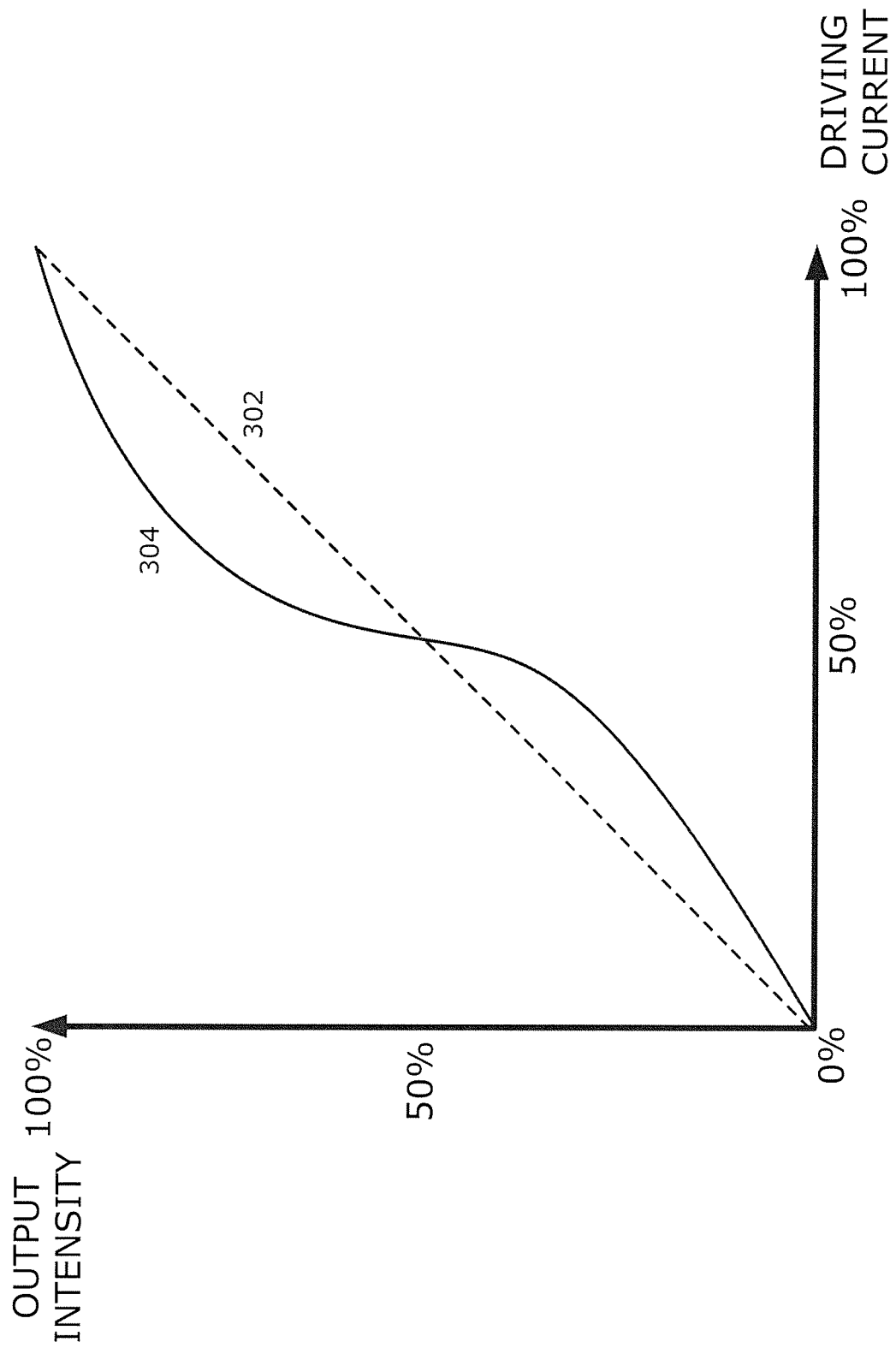
FIG. 3 is a theoretical data plot comparing an example of linear and a non-linear output intensity for an IRLED of the projector, according to an embodiment of the present invention.

An example of a relationship between the driving current and output light intensity for a given IR pixel is shown in FIG. 3. The horizontal axis depicts the driving current of the pixel from 0% (e.g. 0 mA) current to 100% (e.g. 10 mA) current. The vertical axis depicts the light intensity (e.g. apparent heat) produced by the pixel from 0% (e.g. 60° F. of apparent heat when the pixel is turned OFF) intensity to 100% (e.g. 2500° F. of apparent heat when the pixel is fully turned ON) intensity. It is noted that these driving current and light intensity ranges are only one example for a specific IR projector. The ranges may differ depending on the types and capabilities of the pixels in the projector.

As shown in FIG. 3, dashed line 302 represents a linear relationship between the driving current and the output light intensity, where there is a predictable intensity (e.g. one-to-one relationship) for every driving current value (e.g. 25% current produces 25% light intensity, etc.). As described above, such a linear relationship is not possible due to operating temperature of the pixel, manufacturing anomalies of the pixel, etc. For example, solid curve 304 shows a more realistic example of the actual (e.g. non-linear) relationship between the driving current and output light intensity for the pixel.

It should be noted that solid curve 304 is just one example showing a theoretical non-linear relationship between a pixel's driving current and the pixel's output light intensity. Other types of non-linear behavior/curves are possible for a pixel depending on the relationship between its driving current and its output light intensity. It should also be noted that each pixel in the projector array may have somewhat unique non-linear relationship between its driving current and its output light intensity compared to the other pixels in the array (e.g. each pixel has its own uniquely shaped curve).

In order to ensure that the images and video frames are projected accurately, the system performs a non-uniformity determination (NUD) process for each pixel to determine the curve (e.g. solid curve 304) for each pixel. Once determined, solid curve 304 provides an accurate transfer function allowing the projector to accurately project the video frames at the proper light intensity. For example, the NUD determines the transfer function of each pixel and stores these transfer functions in a table of the projector or in the PC. The projector or the PC uses this table to drive the pixels to project accurate video frames.

Figure 4:
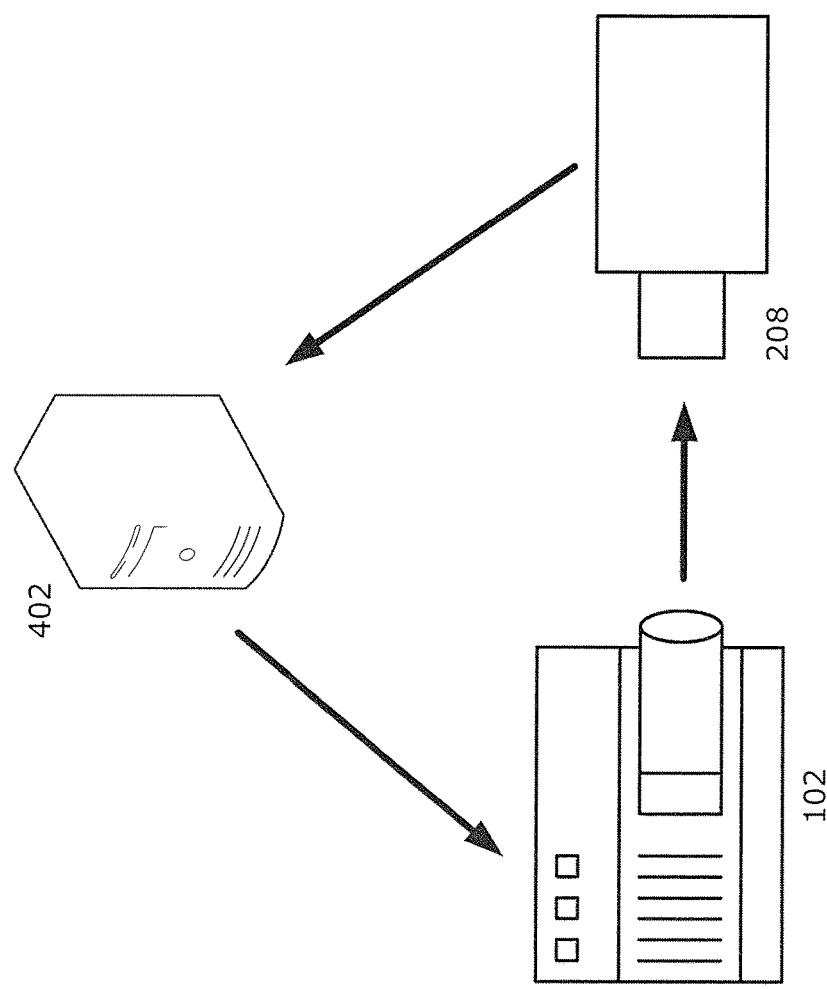
FIG. 4 is a view of the operation flow for a system performing non-uniformity output determination (NUD) for the projector, according to an embodiment of the present invention

The hardware for performing such a calibration process is shown in FIG. 4 to include IRLED projector 102, IR camera 208 and a non-uniformity determination processor (e.g. personal computer (PC) 402) set up in a closed-loop configuration. The calibration procedure for projector 102 is generally performed as follows.

First, PC 402 controls projector 102 to project a test image where a certain subset of the IRLEDs in the grid are illuminated using an initial test driving current. Second, this test image is captured by camera 208 and sent back to PC 402. Third, PC 402 performs the NUD algorithm on the received image and generates another test image where the same subset of IRLEDs in the grid are driven with a modified (e.g. increased or decreased) test driving current. This NUD algorithm is described in detail in later figures. Essentially, this process is repeated multiple times (over multiple frames) for the IRLEDs in the subset until the transfer functions (e.g. curve 302) for every IRLED in the subset is determined. Once the respective transfer functions are determined for each IRLED in the subset, a new subset of different IRLEDs in the grid is chosen, and the process described above is repeated for this new subset to determine their respective transfer functions. Once the process described above is completed for all the IRLEDs in the grid, the PC provides projector 102 with a table that allows the projector to accurately project video frames based on the known relationship between the driving current and output intensity for each pixel. In another example, rather than sending the table to the projector, the PC can modify the frames (e.g. modify frame intensity values) based on the table and simply send the modified frames to the projector that will produce an accurate image.

Selecting and calibrating all of the pixels in the display simultaneously may not be possible due to computational limitations and/or crosstalk between the illuminated pixels. Thus, the display is typically divided into subsets of pixels. Each subset of pixels is typically selected to achieve an acceptable processing time, and the location of the pixels are selected based on relative locations in order to reduce crosstalk to an acceptable level.

For example, in a first step of the NUD algorithm a first subset of pixels in the grid to be calibrated is selected. Once the first subset of pixels is calibrated over a number of frames, a second subset of pixels in the grid is selected and calibrated over a number of frames. This selection/calibration procedure continues until all pixels in the grid display have been calibrated.

An example of selecting pixels is shown in FIGS. 5A-5D. Assuming that the projector only has an 8×8 pixelated display (e.g. grid of 64 total pixels), the NUD algorithm may calibrate the grid in four subsets. A first subset of pixels, shown highlighted in black in FIG. 5A, may be selected and calibrated first. The selected pixels are shown highlighted in black in rows 502, 506, 510 and 514 and columns 518, 522, 526 and 530.

Figure 5B:
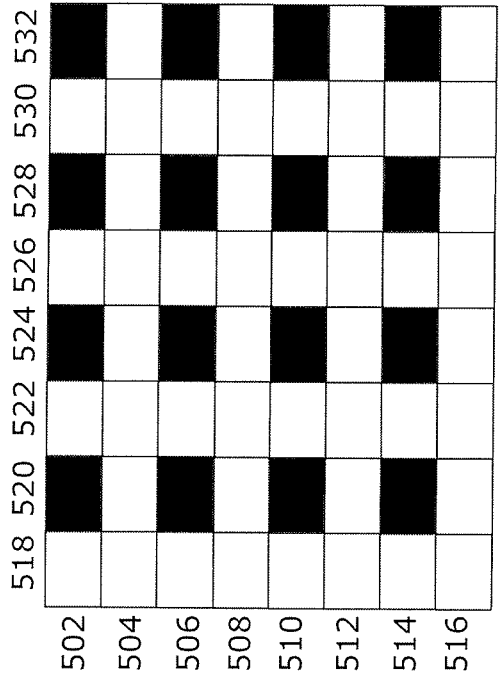
FIG. 5B is a view of a pixelated display having a second set of selected pixels illuminated, according to an embodiment of the present invention.
Figure 5D:
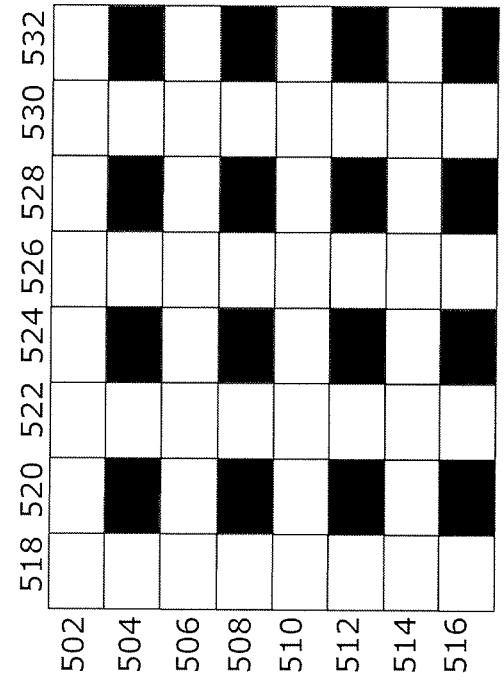
FIG. 5D is a view of a pixelated display having a fourth set of selected pixels illuminated, according to an embodiment of the present invention.
Figure 5A:
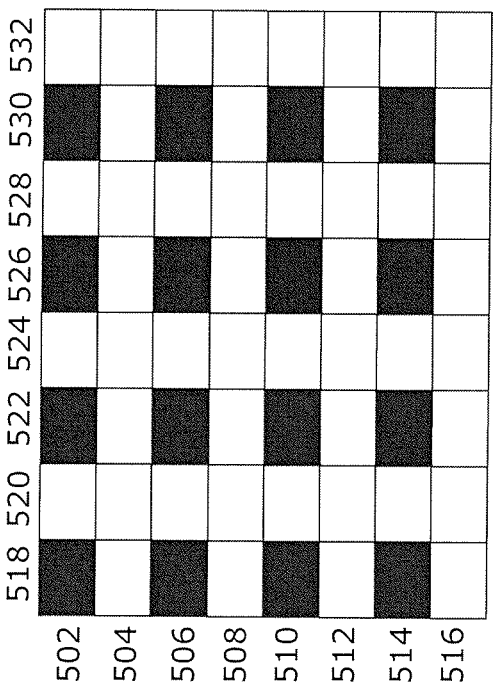
FIG. 5A is a view of a pixelated display having a first set of selected pixels illuminated, according to an embodiment of the present invention.
Figure 5C:
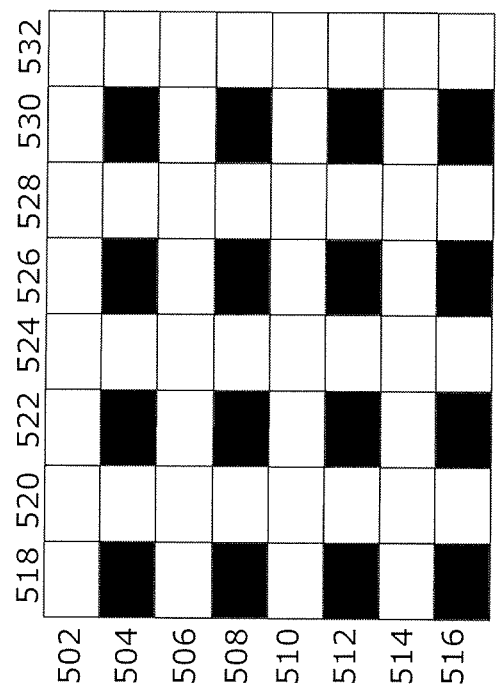
FIG. 5C is a view of a pixelated display having a third set of selected pixels illuminated, according to an embodiment of the present invention.

Notice that the pixels in the subset are not directly adjacent to each other. The pixels in the subset are actually separated by a row and a column in order to reduce crosstalk when illuminated during NUD. Once the subset of pixels in FIG. 5A are calibrated, the NUD algorithm chooses the second subset of pixels (highlighted in black) shown in FIG. 5B. Notice that the second subset of pixels in FIG. 5B are shifted over to the right by one column as compared to the subset of pixels in FIG. 5A. Once the subset of pixels in FIG. 5B are calibrated, the NUD algorithm chooses the third subset of pixels (highlighted in black) shown in FIG. 5C. Once the pixels in FIG. 5C are calibrated, the NUD algorithm chooses the fourth subset of pixels (highlighted in black) shown in FIG. 5D. In this example, the four subsets are selected and calibrated separately (e.g. 16 pixels at a time) until all the pixels (e.g. all 64 pixels) in the display are calibrated. This reduces computational load on the processor and reduces crosstalk between the illuminated pixels during NUD.

It should be noted, that FIGS. 5A-5B show just one example of how pixels may be selected and calibrated. Other selection algorithms are possible (selecting different pixel positions, selecting different numbers of pixels within each subset, etc.). The selection process is configuration depending on the projector, processor power, and various other factors.

Figure 6:
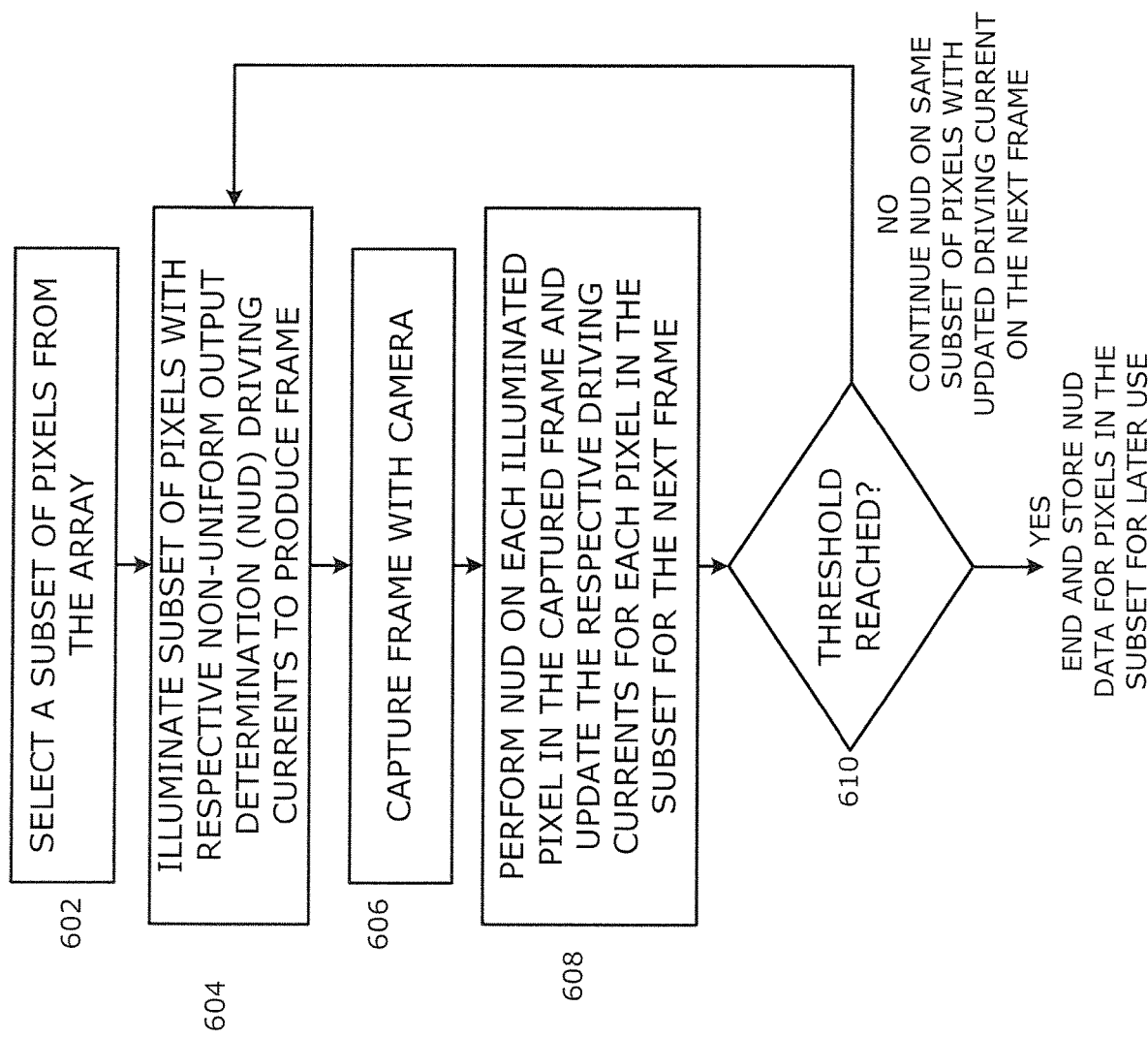
FIG. 6 is a flowchart showing details of the adaptive transfer function measurement algorithm, according to an embodiment of the present invention.

The NUD process was briefly described with respect to FIGS. 4 and 5. The calibration is now described in detail with respect to the flowchart in FIGS. 6 and 7.

In a first step 602, PC 402 selects a subset of pixels from the projector display to be calibrated. This selection, for example, is shown in FIG. 5A where a selected subset of pixels are shown in black. In step 604, PC 402 illuminates a subset of pixels with algorithmically chosen driving currents by sending a test image (e.g. a first frame) to projector 102, instructing projector 102 to illuminate the selected pixels (shown in black) with an initial driving current. The non-selected pixels (shown in white) remain off during this process. In this initial step, the driving current for each selected pixel in the first frame may be selected at the mid-point (e.g. 50%) of the driving current, or some other predetermined or arbitrary driving current. In step 606 the IR 208 camera captures the test image (e.g. first frame) projected by the projector. The test image includes illuminated points projected by the selected pixels (shown in black) separated by non-illuminated regions (shown in white). In step 608, the captured test image is sent to PC 402, where the NUD algorithm is performed on each illuminated point in the test image which correspond to respective illuminated pixels (shown in black).

In general, the NUD algorithm iteratively uses the measured brightness and driving current of each illuminated pixel in current and past iteration/frames to determine respective driving currents of each illuminated pixel for a subsequent iteration/frame. For example, a first iteration of the NUD algorithm (which is described in detail with respect to FIG. 7) is performed to determine data points in the relationship (e.g. transfer function) between the driving current and the output intensity of each illuminated pixel in the selected subset of the grid for the first frame. This first iteration essentially produces respective updated driving currents for each pixel in the subset for the captured frame. If a threshold (e.g. set number of iterations) is not reached (calibration of the pixels in the subset is not complete) in step 610, then the updated driving currents are sent from PC 402 to projector 102, and steps 604-610 are repeated for the same subset of pixels in subsequent iterations (e.g. subsequent frames) until the threshold is reached. If, however, the threshold is reached in step 610, the calibration for the pixels in the subset is considered complete and their transfer functions are stored for later use by the projector. PC 402 then selects a new (different) subset of pixels and starts the process over. Essentially, different subsets of pixels in the grid are repeatedly chosen and calibrated by the iterative NUD algorithm (for a predetermined number of iterations/frames) until all the pixels in the grid have been calibrated.

The details of the NUD algorithm from step 608 are now described with respect to the flowchart in FIG. 7. As already described, the NUD algorithm attempts to determine the relationship (e.g. transfer function) between the driving current and the output intensity for each pixel in the projector display. The details for determining this relationship are described in steps 702-714, which may be implemented by PC 402.

Figure 8B:
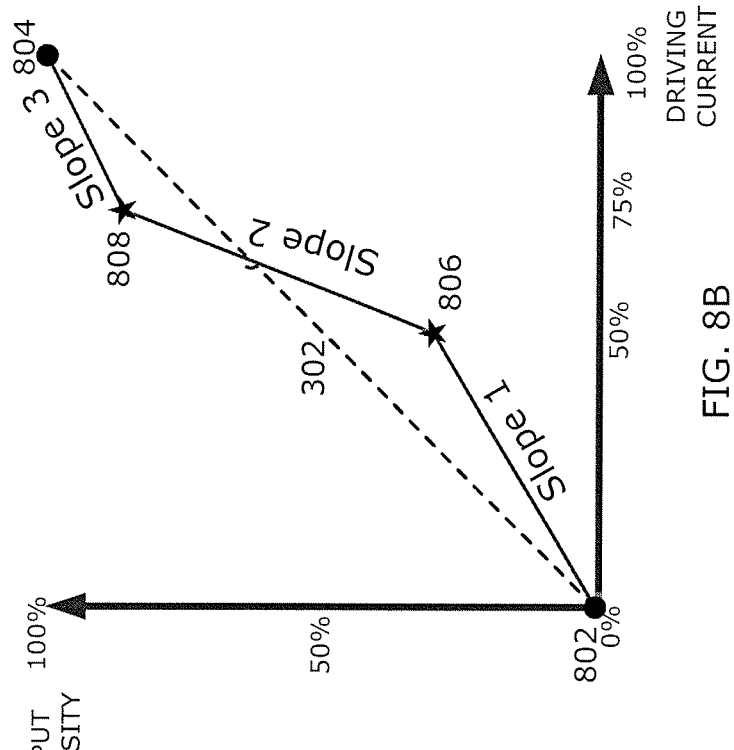
FIG. 8B is another theoretical data plot illustrating the non-uniformity output determination (NUD) algorithm in a second frame/iteration, according to an embodiment of the present invention
Figure 8A:
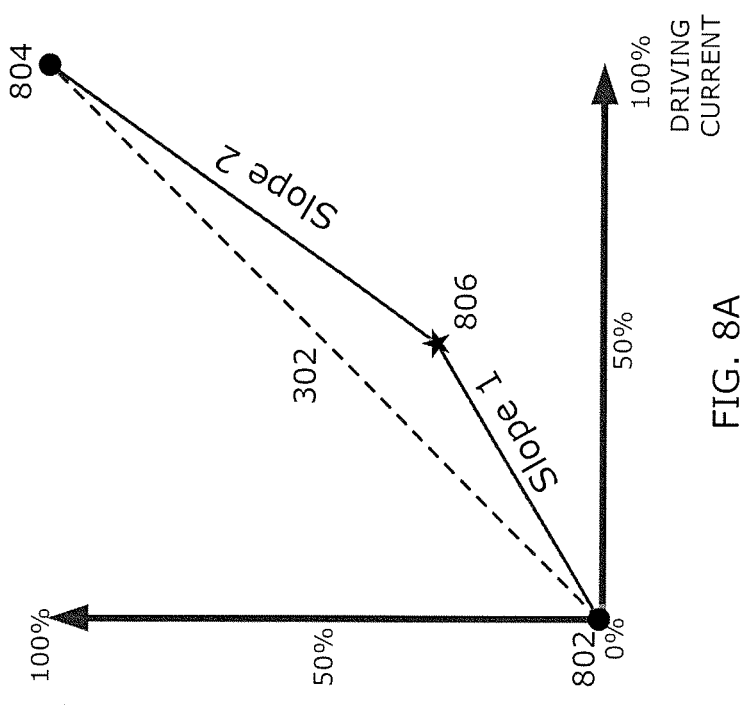
FIG. 8A is a theoretical data plot illustrating the non-uniformity output determination algorithm (NUD) in a first frame/iteration, according to an embodiment of the present invention.

Two example iterations of the NUD algorithm for a given pixel in the subset of pixels are illustrated in FIGS. 8A (first NUD iteration for a given pixel) and 8B (second NUD iteration for the given pixel). It is noted, that while FIGS. 8A and 8B only show the iterations being performed on a single pixel of the subset, that similar (e.g. simultaneous) computations are performed for every pixel in the subset.

As shown in FIG. 8A (first NUD iteration for the given pixel), assuming that the initial driving current for the given pixel in the subset for the first frame was chosen as 50% of the maximum driving current, the intensity value captured by the camera may be determined as point 806 which does not fall on linear line 302. This is due to the non-linear relationship between the driving current and the intensity values of the given pixel.

For illustration purposes, a first solid line segment is shown drawn between point 802 (0% driving current and 0% intensity) and point 806 determined in the first NUD iteration for the given pixel. A second solid line segment is also shown drawn between point 804 (100% driving current and 100% intensity) and point 806.

In step 704, PC 402 then determines the slopes (Δoutput-intensity/Δdriving-current) of the lines between a pair of adjacent intensity/driving current data points for the given pixel. For example, in FIG. 8A, PC 402 determines the slope of the solid line segment between points 802 and 806 (Slope 1) and the slope of the solid line segment between points 804 and 806 (Slope 2) which are then stored in memory.

In step 706, PC 402 then chooses the greatest of the slopes stored in memory (e.g. the greatest of all of the present and previously computed slopes for the pixel). For example, in FIG. 8A, PC 402 would choose Slope 2, because Slope 2>Slope 1. One reason for choosing the greatest of the slopes is that more change is assumed to be occurring between these two points and should therefore be further investigated.

Once the greatest slope (e.g. Slope 2) is chosen, in steps 708/710, PC 402 selects an updated driving current that falls between (e.g. midway between) the points defining the line with the greatest slope. For example, Slope 2 is the greatest slope. Thus, in FIG. 8A, PC 402 would choose a driving current of 75% which is midway between 50% driving current for point 806 and 100% driving current for point 804.

Once the updated driving current is chosen, PC 402 then determines in step 710 if a threshold is reached. The threshold may be a threshold number of iterations/frames for each pixel in the subset. Generally, the threshold can be determined in any number of manners as long as it is set to allow PC 402 to determine an adequate number of data points to determine the relationship (e.g. transfer function) between the driving current and output intensity for the pixel being calibrated. This threshold number may also be different for different applications. In any event, if the threshold is not reached in step 710, then the updated driving current is used in step 702 for a subsequent NUD iteration (e.g. subsequent frame) on the same pixel.

This subsequent iteration is illustrated in FIG. 8B (second NUD iteration for the given pixel) where a second data point 808 is determined for the given pixel in the second frame. For example, in a first step of the second iteration, PC 402 again determines the actual intensity value detected by the IR camera for the given pixel. As shown in FIG. 8B, assuming that the updated driving current for the given pixel was chosen as 75% of the maximum driving current, the corresponding intensity value in the captured frame may be determined as point 808 (75% driving current and ~90% intensity), which again, does not fall on linear line 302 due to the non-linear relationship between the driving current and the intensity values of the given pixel.

For illustration purposes, a first solid line segment is shown drawn between point 802 (0% driving current and 0% intensity) and point 806 determined in the first NUD iteration for the given pixel. A second solid line segment is shown drawn between point 806 and point 808, and a third solid line segment is shown drawn between point 808 and point 804 which are both determined in the second NUD iteration for the given pixel. Each of these three solid line segments have an associated slope.

In step 704, PC 402 then again determines the slopes of the lines segments between the data points for the given pixel. For example, in FIG. 8B, PC 402 determines the slope of the line between points 808 and 806 (Slope 2) and the slope of the line between points 808 and 804 (Slope 3) which are then stored in memory. It should be noted that Slope 1 does not need to be determined, because it did not change and is already stored in memory.

In step 706, PC 402 then chooses the greatest of the slopes stored in memory. For example, in FIG. 8A, PC 402 would choose Slope 2, because Slope 2>(Slope 1 and Slope 3). Once the greatest slope is chosen, in steps 708/710, PC 402 selects an updated driving current that falls between (e.g. midway between) the points defining the line with the greatest slope. For example, Slope 2 is the greatest slope. Thus, in FIG. 8B, PC 402 would choose a driving current of 62.5%, which is midway between 50% for point 806 and 75% for point 808.

Once the updated driving current is chosen, PC 402 then determines in step 710 if the threshold is reached. If the threshold is not reached in step 710, then the updated driving current is used in step 702 again for the subsequent iteration (e.g. third frame/iteration for the given pixel). The NUD algorithm is essentially iterated until the threshold number of iterations/frames is reached. Once the threshold is reached, the calibration for the given pixel in the subset (e.g. one of the pixels in FIG. 5A) is complete and its transfer function is stored in memory for later use.

Although the process is described above, with respect to a single pixel in the subset, it is noted that the NUD process is performed independently and possibly simultaneously for all of the pixels in each selected subset. The threshold (e.g. number of iterations/frames) as well as the driving currents selected for each iteration may be the same for each pixel in the subset, or may be different. In any event, once all of the pixels in the subset are calibrated by the NUD algorithm, then PC 402, as shown in step 714 selects and illuminates another subset of pixels (e.g. the black pixels in FIG. 5B) in the projector and performs the NUD algorithm on this subset of pixels. This process continues until all of the pixels in the grid (e.g. the black pixels in FIGS. 5A, 5B, 5C and 5D) have been calibrated.

Once all the pixels of projector 102 have been calibrated, PC 102 sends their respective transfer functions to the projector. The projector then uses these transfer functions (e.g. as look up table) to project accurate video frames into the field of view of a camera during normal operation (e.g. project an accurate image for use in applications such as the missile application shown in FIG. 2).

It should also be noted that PC 402 may also perform curve fitting (e.g. using a spline curve) based on the transfer function data. The PC 402 can then simply send the coefficients of the spline curve to the projector, rather than sending all of the transfer function data. The projector can then use the spline curve as a look up table.

The NUD process is a relatively fast process that may be performed at any time. In one example, the calibration of the projector can be performed one time upon manufacturing or installation. In another example, the calibration can be performed before each use of the projector. This allows the user the benefit to calibrate the projector at different times over its serviceable lifespan (beginning of the lifespan, middle of the lifespan, end of the lifespan, etc.), and when it is exposed to differing ambient conditions (hot environments, cold environments, dry environments, humid environments, etc.).

Alternatively, NUD for the projector can be performed during the actual simulation (rather than before the simulation). For example, when performing a simulation (e.g. missile guidance system simulation), the PC can insert calibration frames in between a number of the actual video frames of the simulation. The camera on the missile will then capture these calibration frames and send them to the PC for processing. This allows the table used to drive the pixels to be generated and/or updated at the same time the simulation is occurring.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A calibration system comprising:
    a pixelated display including pixels for projecting an image;
    an imager positioned to capture the image produced by the pixelated display; and
    a non-uniformity determination processor configured to perform measurement of non-uniformity in the image produced by the pixelated display by repeatedly:
        a) selecting and illuminating a subset of the pixels in the pixelated display with respective driving currents,
        b) controlling the imager to capture the image projected by the subset pixels,
        c) determining and storing, for each pixel in the subset, an intensity value produced in response to the respective driving current, and
        d) updating, for each pixel in the subset, a relationship between the determined intensity value produced by the respective pixel in response to the driving current, the relationship updated by:
            computing slopes between:
                1) the determined intensity value produced by the respective pixel in response to the driving current, and
                2) previously stored intensity values produced by the respective pixel in response to previously stored driving currents, and
            updating, for each pixel in the subset, the respective driving current to a value that corresponds to an intensity value along at least one of the slopes,
    wherein the relationship includes a plurality of driving currents that correspond to a plurality of intensity values for the respective pixel.

2. The calibration system of claim 1,
    wherein, to update the respective driving currents, the non-uniformity determination processor is further configured to:
        determine, for each pixel in the subset, a first slope computed between the determined intensity value and at least a first previously stored intensity value at a corresponding first driving current,
        determine, for each pixel in the subset, a second slope computed between the determined intensity value and at least a second previously stored intensity value at a corresponding second driving current,
        choose, for each pixel in the subset, the greatest of the first slope, the second slope, or any other slope previously computed for that respective pixel, and
        update, for each pixel in the subset, the respective driving current to a value that corresponds to an intensity value along the chosen slope.

3. The calibration system of claim 1,
    wherein the non-uniformity determination processor is further configured to:
        illuminate a different subset of the pixels in the pixelated display with respective driving currents after a number of iterations of steps (a)-(d) are complete, and
        repeatedly perform steps (a)-(d) on the different subset of the pixels.

4. The calibration system of claim 1,
    wherein the non-uniformity determination processor is further configured to:
        select positions of the subset of the pixels within the pixelated display such that cross-talk between the illuminated pixels in the subset is below a threshold when performing perform steps (a)-(d).

5. The calibration system of claim 1,
    wherein the pixelated display includes a grid of infrared (IR) light emitting diodes (LEDs) as the pixels.

6. The calibration system of claim 1,
    wherein the non-uniformity determination processor is further configured to:
        stop performing steps (a)-(d) on the selected subset of the pixels when a threshold is reached, the threshold being a threshold number of iterations, a threshold difference in intensity between iterations, or a threshold difference in driving current between iterations.

7. The calibration system of claim 1,
    wherein after the subset of the pixels are corrected, the non-uniformity determination processor is further configured to:
        send the stored pixel intensity values and corresponding driving currents for each pixel in the subset to the pixelated display, such that images projected by the pixelated display are corrected.

8. The calibration system of claim 2,
    wherein the non-uniformity determination processor is further configured to:
        update, for each pixel in the subset, the respective driving current value, by selecting a driving current located midway between respective driving currents corresponding to the intensity values defining the slope.

9. The calibration system of claim 1,
    wherein, after the pixels in the subset are corrected, the non-uniformity determination processor is further configured to:
        perform curve fitting for the stored data of each pixel to derive a curve, and
        drive the pixelated display using the derived curve, such that images projected by the pixelated display are corrected.

10. The calibration system of claim 1,
    wherein the non-uniformity determination processor is further configured to:
        perform steps (a)-(d) in between video frames while a video is being projected by the pixelated display.

11. A non-uniformity determination method for a pixelated display including pixels for projecting an image, the method comprising:
    capturing, by an imager, the image produced by the pixelated display; and
    performing, by a non-uniformity determination processor, determination of non-uniformity in the image produced by the pixelated display by repeatedly:
        a) selecting and illuminating a subset of the pixels in the pixelated display with respective driving currents,
        b) controlling the imager to capture the image projected by the subset pixels, c) determining and storing, for each pixel in the subset, an intensity value produced in response to the respective driving current, and d) updating, for each pixel in the subset, a relationship between the determined intensity value produced by the respective pixel in response to the driving current, the relationship updated by:

computing slopes between:
1) the determined intensity value produced by the respective pixel in response to the driving current, and
2) previously stored intensity values produced by the respective pixel in response to previously stored driving currents, and updating, for each pixel in the subset, the respective driving current to a value that corresponds to an intensity value along at least one of the slopes, wherein the relationship includes a plurality of driving currents that correspond to a plurality of intensity values for the respective pixel.

12. The non-uniformity determination method of claim 11, further comprising:

updating, by the non-uniformity determination processor, the respective driving currents by:

determining, for each pixel in the subset, a first slope computed between the determined intensity value and at least a first previously stored intensity value at a corresponding first driving current, determining, for each pixel in the subset, a second slope computed between the determined intensity value and at least a second previously stored intensity value at a corresponding second driving current, choosing, for each pixel in the subset, the greatest of the first slope, the second slope, or any other slope previously computed for that respective pixel, and updating, for each pixel in the subset, the respective driving current to a value that corresponds to an intensity value along the chosen slope.

13. The non-uniformity determination method of claim 11, further comprising:

illuminating, by the non-uniformity determination processor, a different subset of the pixels in the pixelated display with respective driving currents after a number of iterations of steps (a)-(d) are complete, and repeatedly performing, by the non-uniformity determination processor, steps (a)-(d) on the different subset of the pixels.

14. The non-uniformity determination method of claim 11, further comprising:

selecting, by the non-uniformity determination processor, positions of the subset of the pixels within the pixelated display such that cross-talk between the illuminated pixels in the subset is below a threshold when performing perform steps (a)-(d).

15. The non-uniformity determination method of claim 11, wherein the pixelated display includes a grid of infrared (IR) light emitting diodes (LEDs) as the pixels.

16. The non-uniformity determination method of claim 11, further comprising:

stopping performing steps (a)-(d) on the selected subset of the pixels, by the non-uniformity determination processor, when a threshold is reached, the threshold being a threshold number of iterations, a threshold difference in intensity between iterations, or a threshold difference in driving current between iterations.

17. The non-uniformity determination method of claim 11, further comprising:

after the subset of the pixels are corrected, sending, by the non-uniformity determination processor, the stored pixel intensity values and corresponding driving currents for each pixel in the subset to the pixelated display, such that images projected by the pixelated display are corrected.

18. The non-uniformity determination method of claim 12, further comprising:

updating, by the non-uniformity determination processor, for each pixel in the subset, the respective driving current value, by selecting a driving current located midway between respective driving currents corresponding to the intensity values defining the slope.

19. The non-uniformity determination method of claim 11, further comprising:

after the pixels in the subset are corrected:
performing, by the non-uniformity determination processor, curve fitting for the stored data of each pixel to derive a curve, and driving the pixelated display using the derived curve, such that images projected by the pixelated display are corrected.

20. The non-uniformity determination method of claim 11, further comprising:

performing, by the non-uniformity determination processor, steps (a)-(d) in between video frames while a video is being projected by the pixelated display.

* * * * *